US008600581B2

(12) United States Patent
Lee

(10) Patent No.: US 8,600,581 B2
(45) Date of Patent: Dec. 3, 2013

(54) SYSTEM AND METHOD FOR VEHICLE CONTROL USING HUMAN BODY COMMUNICATION

(75) Inventor: Jong Bok Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 24 days.

(21) Appl. No.: 13/361,120

(22) Filed: Jan. 30, 2012

(65) Prior Publication Data

US 2012/0303181 A1    Nov. 29, 2012

(30) Foreign Application Priority Data

May 25, 2011 (KR) .................... 10-2011-0049704

(51) Int. Cl.
*G06F 17/00* (2006.01)
(52) U.S. Cl.
USPC .................. 701/2; 726/28; 340/5.2; 340/531; 340/573.1
(58) Field of Classification Search
USPC ........ 701/2; 340/5.2, 5.53, 5.83, 426.11, 500, 340/531, 573.1; 700/245; 726/26–28
See application file for complete search history.

(56) References Cited

U.S. PATENT DOCUMENTS

| | | | | |
|---|---|---|---|---|
| 5,686,765 | A * | 11/1997 | Washington | 307/10.5 |
| 6,185,852 | B1 * | 2/2001 | Whalen et al. | 42/70.11 |
| 7,065,647 | B2 * | 6/2006 | Funahashi | 713/168 |
| 7,142,089 | B2 * | 11/2006 | Yamagishi | 340/5.52 |
| 8,344,849 | B2 * | 1/2013 | Larsson et al. | 340/5.2 |
| 8,368,527 | B2 * | 2/2013 | Kano et al. | 340/531 |
| 2002/0104013 | A1 * | 8/2002 | Ghazarian | 713/200 |
| 2004/0078118 | A1 * | 4/2004 | Binder | 701/1 |
| 2007/0183633 | A1 * | 8/2007 | Hoffmann | 382/116 |
| 2009/0224879 | A1 * | 9/2009 | Nakazawa et al. | 340/5.72 |
| 2010/0308999 | A1 * | 12/2010 | Chornenky | 340/573.1 |

FOREIGN PATENT DOCUMENTS

| | | |
|---|---|---|
| KR | 10-2008-0040857 | 5/2008 |
| KR | 10-2008-0040858 | 5/2008 |
| KR | 10-2008-0040859 | 5/2008 |
| KR | 10-2010-0056688 | 5/2010 |

\* cited by examiner

*Primary Examiner* — Russell Frejd
(74) *Attorney, Agent, or Firm* — Edwards Wildman Palmer LLP; Peter F. Corless

(57) ABSTRACT

A mobile terminal capable of performing a human body communication is provided. The mobile terminal includes an authentication information storage unit, a control unit, and a human body communication unit. The authentication information storage unit stores authentication information of each authentication level. The control unit transmits authentication information of a preset authentication level to a human body communication unit when a communication path is established between the human body communication unit and a vehicle control apparatus externally located. The human body communication unit transmits the authentication information received from the control unit to the vehicle control apparatus.

9 Claims, 4 Drawing Sheets

SYSTEM AND METHOD FOR VEHICLE CONTROL USING HUMAN BODY COMMUNICATION

CROSS-REFERENCES TO RELATED APPLICATIONS

Priority to Korean patent application number 10-2011-0049704, filed on May 25, 2011, which is incorporated by reference in its entirety, is claimed.

BACKGROUND OF THE INVENTION

1. Field of the Invention

The present invention relates to a system and a method for vehicle control using a human body communication, and more particularly to, a system and a method for vehicle control using a human body communication in which vehicle control is differentiated according to an authentication level of authentication information received from a user based on a human body communication.

2. Description of the Related Art

A technique of transmitting and receiving data using a human body as a transmission medium of an electrical signal has been proposed. An apparatus for transmitting and receiving the electrical signal using the human body as the transmission medium can be applied to various fields including medical diagnostic equipment. In the apparatus for transmitting and receiving data using the human body as the transmission medium of the electrical signal, an electrode that is in direct contact with the human body is provided so that the human body can be used as the transmission medium.

The apparatus for transmitting and receiving the electrical signal by using the human body as the transmission medium does not require separate wired or wireless communication equipment to enable data transmission and reception between a user and a system because transmission of the electrical signal is possible simply by contacting the human body with a particular device. A human body communication apparatus can be applied to various fields to improve user convenience in data transmission without requiring a separate wired or wireless communication equipment or communication line.

Recently, a key emphasis has been placed on driver's convenience when developing new vehicles. A smart key technology has been developed to relieve driver's inconvenience of having to unlock a vehicle door and turn a key to start a vehicle; however, the smart key technology does not meet full driver's satisfaction at times time.

SUMMARY OF THE INVENTION

The present invention provides a system and a method for vehicle control using a human body communication in which vehicle control is differentiated according to an authentication level of authentication information received from a user based on a human body communication, thereby improving user convenience.

According to an aspect of the present invention, provided is a mobile terminal capable of performing a human body communication, the mobile terminal includes an authentication information storage unit configured to store authentication information of each authentication level; a control unit configured to transmit authentication information of a preset authentication level to a human body communication unit when a communication path is established between the human body communication unit and a vehicle control apparatus externally located; and the human body communication unit configured to transmit the authentication information received from the control unit to the vehicle control apparatus.

According to another aspect of the present invention, provided is a vehicle control apparatus capable of performing a human body communication, the vehicle control apparatus includes an authentication information storage unit configured to store authentication information of each authentication level and control information of a corresponding authentication level; a human body communication unit configured to receive the authentication information from a mobile terminal by using a human body as a medium; an authentication unit configured to authenticate a validity of the authentication information received by the human body communication unit based on the authentication information storage unit; and a vehicle control unit configured to control a corresponding device of a vehicle based on the control information of the corresponding authentication level according to an authentication result of the authentication unit.

According to another aspect of the present invention, provided is a vehicle control method using a human body communication, the vehicle control method storing, by a storage unit, authentication information of each authentication level and control information of a corresponding authentication level; receiving the authentication information from a mobile terminal by using a human body as a medium; authenticating, by an authentication unit, a validity of the received authentication information based on the stored authentication information; and controlling, by a control unit, a corresponding device of a vehicle based on the control information of the corresponding authentication level according to an authentication result.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of image display method and apparatus according to the present invention are described with reference to the accompanying drawings in detail. Detailed descriptions of well-known functions and structures incorporated herein may be omitted to avoid obscuring the subject matter of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
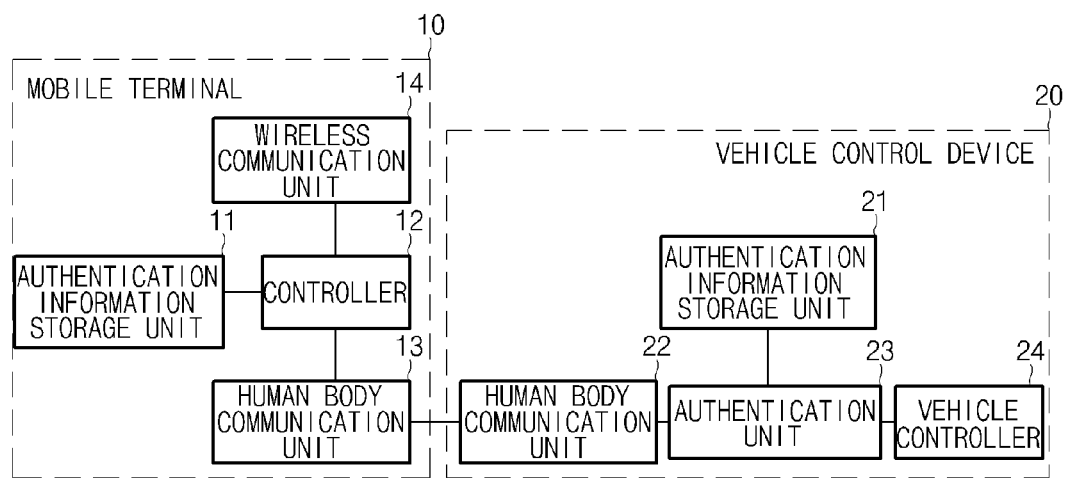
FIG. 1 illustrates a configuration of a vehicle control system using a human body communication according to an exemplary embodiment of the present invention.

FIG. 1 illustrates a configuration of a vehicle control system using a human body communication according to an exemplary embodiment of the present invention.

As shown in FIG. 1, according to the present invention, the vehicle control system using the human body communication includes a mobile terminal 10 possessed by a user and a vehicle control device 20 mounted within a vehicle. The mobile terminal 10 stores authentication information of each authentication level and sends preset authentication information to the vehicle control device 20 through the human body communication. When the authentication information is received from the mobile terminal 10 through the human body communication, the vehicle control device 20 performs authentication and performs vehicle control depending on a corresponding authentication level.

Hereinafter, each component of the mobile terminal 10 including an authentication information storage unit 11, a controller 12, a human body communication unit 13, and a wireless communication unit 14 is described in detail. Here, the mobile terminal 10 includes, but is not limited to, a mobile communication terminal, a smart phone, a smart key, or a smart card that can perform the human body communication.

First, the authentication information storage unit 11 stores a plurality of authentication information having a preset authentication level. Here, when the mobile terminal 10 belongs to a vehicle owner, for example, the authentication information storage unit 11 stores all authentication information of each authentication level listed in Table 1 shown below. However, when the mobile terminal 10 belongs to a valet attendant, the authentication information storage unit 11 stores authentication information corresponding to an authentication level 2 received from the mobile phone 10 of the vehicle owner, and when the mobile terminal 10 belongs to a neighbor, the authentication information storage unit 11 stores authentication information corresponding to an authentication level 3 received from the mobile phone 10 of the vehicle owner.

It should be noted that the mobile terminal 10 of the valet attendant stores all authentication information of each authentication level related to a vehicle owned by the valet attendant, and the mobile terminal 10 of the neighbor stores all authentication information of each authentication level related to with a vehicle owned by the neighbor.

For example, for illustrative purposes, it is assumed that a user A owns a vehicle A1, a user B owns a vehicle B1, and a user C owns a vehicle C1. Here, a mobile terminal of the user A stores the authentication information a1, a2, a3, for vehicle control of vehicle A1, a mobile terminal of the user B stores the authentication information b1, b2, b3, for vehicle control of vehicle B1, and a mobile terminal of the user C stores the authentication information c1, c2, c3, for vehicle control of vehicle C1.

When the user A is a customer, the user B is a valet attendant of the user A, and the user C is a neighbor of the user A, when the user A hands his or her vehicle to the user B for valet parking, the user A transmits the authentication information a2 from his or her own mobile terminal to the mobile terminal of the user B. Accordingly, the user B can control limited features of the vehicle A1 by using the user authentication information a2.

Similarly, when the user A parks his or her vehicle in front of the vehicle C1, the user A sends the authentication information a3 from his or her mobile terminal to the mobile terminal of the user C. Accordingly, the user C can control limited features of the vehicle A1 by using the user authentication information a3. Below are exemplary controls which each authentication level may possess. Please note that these controls may be programmable and are not limited to those outlined in the Control List below.

TABLE 1

| Authentication Level | User | Control List |
| --- | --- | --- |
| 1 | Owner | Door Opening, Start-up Permission, Seat Adjustment, Seat Belt Adjustment, Steering Wheel Adjustment, Angle Adjustment of a Side Mirror and a Rear View Mirror, Lamp Adjustment, and Automatic Music Selection |
| 2 | Valet Attendant | Door Opening, Start-up Permission, Driving Distance Restriction |
| 3 | Neighbor | Door Opening |

Here, the authentication information includes at least one of a vehicle identification number, a vehicle owner's name, a social security number, and a password. Each information is encrypted and cannot be hacked by others.

Also, when using a smart key, authentication information 'Start-up Permission' indicates the smart key being located within the vehicle. Therefore, the user can start or stop an engine at any time by pressing a starter/stop button.

In addition, authentication information 'Driving Distance Restriction' refers to a driving distance being restricted to a distance (e.g., 1 km) set based on the fact that a driving distance is usually limited when a vehicle is being valet parked. According to 'Driving Distance Restriction,' the vehicle can be controlled to shut down the engine when the vehicle is driven more than the set driving distance.

Next, when a communication path is established between the human body communication unit 13 and a human body communication unit 22 of the vehicle control device 20, the controller 12 transmits the authentication information having a preset authentication level to the vehicle control device 20 through the human communication unit 13.

Here, in case of the mobile terminal of the vehicle owner, the authentication information having the preset authentication level corresponds to the authentication information set by the vehicle owner, i.e., the authentication information a1 in the example above, and, in case of the mobile terminal of the valet attendant, the authentication information corresponds to the authentication information a2 in the example above, and, in case of the mobile terminal of the neighbor, the authentication information corresponds to the authentication information a3 in the example above.

In addition, the controller 12, upon request from the user, can send the authentication information stored in the authentication information storage unit 11 to a mobile terminal of another user through the wireless communication unit 14.

Next, the wireless communication unit 14, under the control of the controller 12, transmits the authentication information to another person's mobile terminal. Here, various communication methods can be employed including mobile communication, Wireless Broadband (WiBro) and short range wireless communication such as, for example, Bluetooth or ZigBee. In addition, the human body communication unit 13 can transfer the authentication information stored in the authentication information storage unit 11 to the vehicle control device 20.

Hereinafter, each element of an authentication information storage unit 21, the human body communication unit 22, an authentication unit 23 and a vehicle controller 24 of the vehicle control device 20 is described in detail. Here, the authentication unit 23 and the vehicle controller 24 can be implemented through an electronic control unit (ECU).

First, the authentication information storage unit 21 stores authentication information of each authentication level as shown in Table 1 above and a control list and a control value (hereinafter, control information) of a corresponding authentication level. In other words, the authentication information storage unit 21 stores the authentication information of each authentication level and corresponding control information thereof. Here, the control information includes the control list of a corresponding authentication level and a setup value of a corresponding device to be controlled.

The human body communication unit 22 is installed on, e.g., a door handle of the vehicle and is configured to activate when touched by the user's hand when the user opens a door of the vehicle. When touched by the user's hand, the human body communication unit 22 sends the authentication information received from the mobile terminal 10 to the authentication unit 23. Here, the human body communication unit 13 of the mobile terminal 10 needs to be in contact with the user's body.

The authentication unit 23 authenticates validity of the authentication information received through the human body communication unit 22, based on the authentication information storage unit 21, and sends an authentication result to the vehicle controller 24. According to the authentication result of the authentication unit 23, the vehicle controller 24 permits a corresponding operation in the control list.

In other words, when the authentication result corresponds to an authentication level 1, the user is the vehicle owner and operations including, for example, door opening, start-up permission, seat adjustment, seat belt adjustment, steering wheel adjustment, angle adjustment of a side mirror and a rear view mirror, lamp adjustment, and automatic music selection, can be controlled based on preset information.

When the authentication result corresponds to the authentication level 2, the user is, in this example, the valet attendant and operations including, for example, door opening, start-up, and driving distance restriction can be controlled based on the preset information.

When the authentication result corresponds to the authentication level 3, the user, in this example, is the neighbor and an operation including, for example, door opening can be controlled based on the preset information.

In addition, when it is detected that a driver turns off the engine and gets out of the vehicle, the vehicle controller 24 automatically locks vehicle doors after a certain period of time (e.g., about five seconds). Here, the driver's departure from the vehicle can be detected by installing a pressure sensor (not shown) on a seat.

Figure 2:
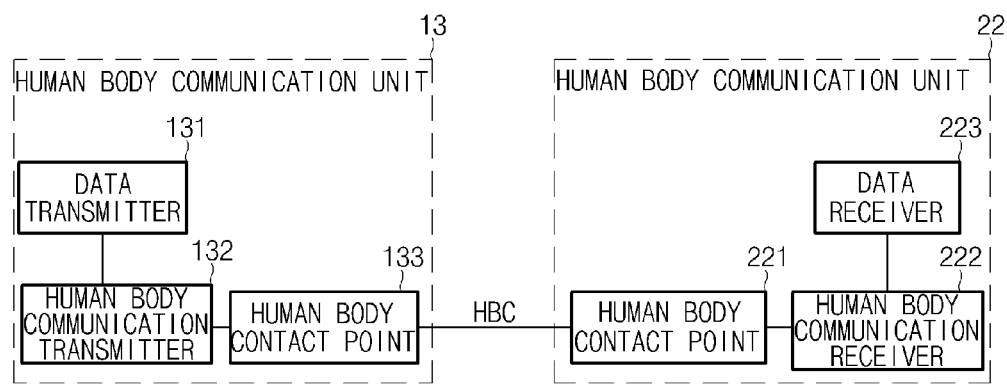
FIG. 2 is illustrates a configuration of a human body communication unit according to an exemplary embodiment of the present invention.

Hereinafter, with reference to FIG. 2, a human body communication between the human body communication unit 13 of the mobile terminal 10 and the human body communication unit 22 of the vehicle control device 20 is described in detail below.

First, the human body communication unit 13 of the mobile terminal 10 includes a data transmitter 131, a human body communication (HBC) transmitter 132, and a human body contact point (electrode) 133.

The data transmitter 131 transmits the authentication information received from the controller 12 to the human body communication transmitter 132. The human body communication transmitter 132 converts the authentication information received from the data transmitter 131 into an electric signal that can be transmitted by a human body as a transmission medium and transmits the electric signal to the vehicle control device 20 through the human body that is in contact with the human body contact point 133. Here, both the human body contact point 133 of the mobile terminal 10 and a human body contact point 221 of the vehicle control device 20 need to be in contact with the human body. The electric signal is transmitted from the human body communication transmitter 132 through the human body as the transmission medium while the human body contact point 133 maintains a direct contact with skin or through clothing interposed between the human body contact point 133 and the human body.

Next, the human body communication unit 22 of the vehicle control device 20 includes the human body contact point (electrode) 221, a human body communication (HBC) receiver 222, and a data receiver 223. The electric signal is received from the human body communication transmitter 132 of the human body communication unit 13 through the human body as the transmission medium while the human body contact point 221 maintains a direct contact with skin or through clothing interposed between the human body contact point 221 and the human body. Here, the human body contact point 221 is preferably installed on the door handle of the vehicle.

The human body communication receiver 222 converts the electric signal received from the human body communication unit 13 through the human body contact point 221 via the human body as the transmission medium into original authentication information and transmits the converted original authentication information to the data receiver 223. The data receiver 223 receives the authentication information from the human body communication receiver 222.

Meanwhile, the human body communication 13 of the mobile terminal 10 and the human body communication unit 22 of the vehicle control device 20 can be configured to enable a two way communication. In other words, to enable a two way communication therebetween, the human body communication unit 13 of the mobile terminal 10 can further include a human body communications receiver and a data receiver, and the human body communication unit 22 of the vehicle control device 20 can further include a human body communication transmitter and a data transmitter.

Figure 3:
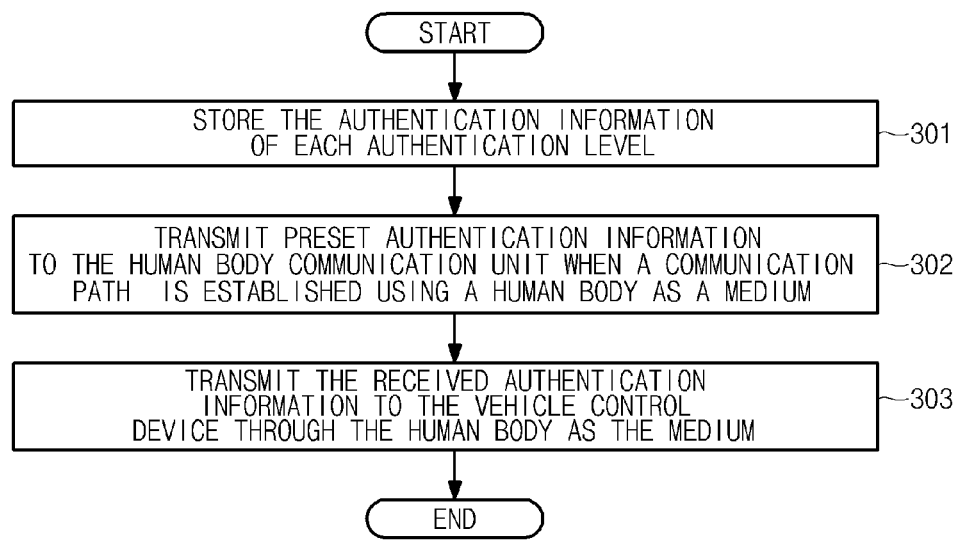
FIG. 3 is a flowchart diagram illustrating a vehicle control method using a human body communication in a mobile terminal according to an exemplary embodiment of the present invention.

FIG. 3 is a flowchart diagram illustrating a vehicle control method using a human body communication in a mobile terminal according to an exemplary embodiment of the present invention. First, the authentication information storage unit 11 stores the authentication information of each authentication level (301). Next, when a communication path is established between the human body communication unit 13 and the vehicle control device 20 that is externally located, the controller 12 transmits the authentication information having an authentication level preset by the user to the human body communication unit 13 (302). Subsequently, the human body communication unit 13 transmits the authentication information received from the controller 12 to the vehicle control device 20 through the human body as the transmission medium (303).

Figure 4:
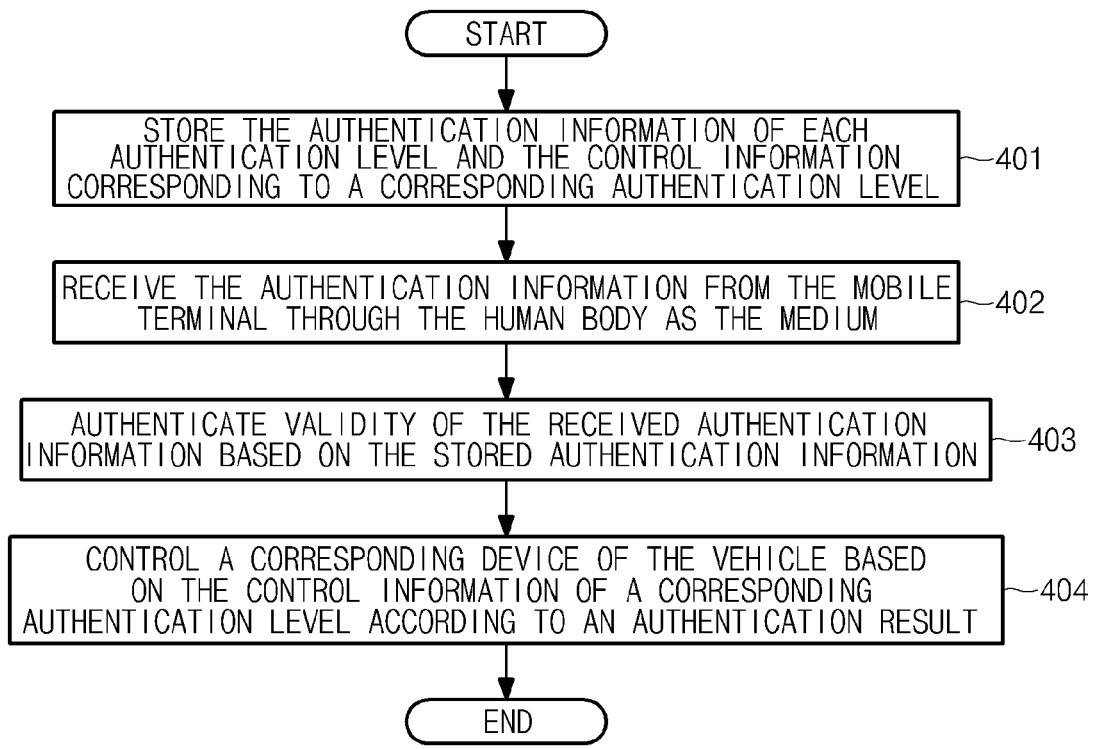
FIG. 4 is a flowchart diagram illustrating a vehicle control method using a human body communication in a vehicle control device according to an exemplary embodiment of the present invention.

FIG. 4 is a flowchart diagram illustrating a vehicle control method using a human body communication in a vehicle control apparatus according to an exemplary embodiment of the present invention. First, the authentication information storage unit 21 stores the authentication information of each authentication level and the control information corresponding to a corresponding authentication level (401). Next, the human body communication unit 22 receives the authentication information from the mobile terminal 10 through the human body as the transmission medium (402). Then, the authentication unit 23 authenticates validity of the received authentication information based on the stored authentication information (403).

In other words, the authentication unit 23 identifies the validity of the authentication information received from the mobile terminal 10 and an authentication level thereof. Subsequently, according to an authentication result of the authentication unit 23, the vehicle controller 24 can control a corresponding device of the vehicle based on the control information of a corresponding authentication level (404).

Thus, according to the present invention, vehicle control can be differentiated according to the authentication level of the authentication information received from the user through the human body communication. Additionally, user convenience can be improved by differentiating the vehicle control according to the authentication level of the authentication information received from the user through the human body communication.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A vehicle control apparatus capable of performing a human body communication, the vehicle control apparatus comprising:
   an authentication information storage unit configured to store authentication information of each authentication level and control information of a corresponding authentication level;
   a human body communication unit configured to receive the authentication information from a mobile terminal by using a human body as a medium;
   an authentication unit configured to authenticate a validity of the authentication information received by the human body communication unit based on the authentication information storage unit; and
   a vehicle control unit configured to control a corresponding device of a vehicle based on the control information of the corresponding authentication level according to an authentication result of the authentication unit.

2. The vehicle control apparatus according to claim 1, wherein the vehicle control unit is configured to automatically lock a vehicle door after a certain period of time upon detecting that a vehicle engine is stopped and a driver alights from the vehicle.

3. The vehicle control apparatus according to claim 1, wherein the human body communication unit comprises:
   a human body contact point installed on a vehicle door handle and configured to receive an electrical signal from the mobile terminal by using the human body as the medium;
   a human body communication receiver configured to convert the electrical signal received through the human body contact point into the authentication information; and
   a data receiver configured to receive the authentication information from the human body communication receiver.

4. A vehicle control method using a human body communication, the vehicle control method comprising:
   storing, by a storage unit on a vehicle control device, authentication information of each authentication level and control information of a corresponding authentication level;
   receiving, by the vehicle control device, the authentication information from a mobile terminal by using a human body as a medium;
   authenticating, by the vehicle control device, a validity of the received authentication information based on the stored authentication information; and
   controlling, by the vehicle control device, a corresponding device of a vehicle based on the control information of the corresponding authentication level according to an authentication result.

5. The vehicle control method according to claim 4, further comprising:
   automatically locking a vehicle door after a certain period of time upon detecting a vehicle engine is shut down and a driver alights from the vehicle.

6. The vehicle control method according to claim 4, wherein the receiving of the authentication information comprises:
   receiving an electrical signal from the mobile terminal by using the human body as the medium;
   converting the received electrical signal into the authentication information; and
   receiving the converted authentication information.

7. A non-transitory computer readable medium containing program instructions executed by a processor or controller, the computer readable medium comprising:
   program instructions that store authentication information of each authentication level and control information of a corresponding authentication level;
   program instructions that interpret the authentication information received from a mobile terminal by using a human body as a medium;
   program instructions that authenticate a validity of the received authentication information based on the stored authentication information; and
   program instructions that control a corresponding device of a vehicle based on the control information of the corresponding authentication level according to an authentication result.

8. The non-transitory computer readable medium according to claim 7, further comprising:
   program instructions that automatically locking a vehicle door after a certain period of time upon detecting a vehicle engine is shut down and a driver alights from the vehicle.

9. The non-transitory computer readable medium according to claim 7, wherein the program instructions that interpret the authentication information received from a mobile terminal further comprise:

program instructions that interpret an electrical signal from the mobile terminal by using the human body as the medium; and program instructions that convert the received electrical signal into the authentication information; and program instructions that validate the converted authentication information.

\* \* \* \* \*